United States Patent
Shih et al.

(10) Patent No.: US 8,908,141 B2
(45) Date of Patent: Dec. 9, 2014

(54) DISPLAY PANEL AND LIQUID CRYSTAL DEVICE WITH THE SAME

(75) Inventors: Ming-hung Shih, Guandong (CN); Zuomin Liao, Guandong (CN)

(73) Assignee: Shenzhen China Star Optoelectronics Technology Co., Ltd., Shenzhen, Guangdong (CN)

(*) Notice: Subject to any disclaimer, the term of this patent is extended or adjusted under 35 U.S.C. 154(b) by 0 days.

(21) Appl. No.: 13/642,529

(22) PCT Filed: Sep. 6, 2012

(86) PCT No.: PCT/CN2012/081066
§ 371 (c)(1),
(2), (4) Date: Oct. 21, 2012

(87) PCT Pub. No.: WO2014/032324
PCT Pub. Date: Mar. 6, 2014

(65) Prior Publication Data
US 2014/0063431 A1 Mar. 6, 2014

(30) Foreign Application Priority Data
Aug. 28, 2012 (CN) .......................... 2012 1 0310044

(51) Int. Cl.
*G02F 1/1337* (2006.01)
*G02F 1/1339* (2006.01)

(52) U.S. Cl.
CPC ................... *G02F 1/1339* (2013.01)
USPC ............ 349/156; 349/123; 349/153; 349/155

(58) Field of Classification Search
CPC .......................... G02F 1/1337; G02F 1/13394
USPC .......................................... 349/123, 153, 155
See application file for complete search history.

(56) References Cited

U.S. PATENT DOCUMENTS

2012/0287383 A1* 11/2012 Gotoh ........................... 349/106

* cited by examiner

*Primary Examiner* — Phu Vu
(74) *Attorney, Agent, or Firm* — Andrew C. Cheng

(57) ABSTRACT

A display panel and a liquid crystal device are disclosed. The display panel includes a first substrate, a second substrate opposite to the first substrate, a sealant. The first substrate is arranged with a first alignment film. The second substrate is arranged with a second alignment film. The sealant surrounds the first substrate and the second substrate. A first wall is arranged on the first substrate, and the first wall is between an edge of the first alignment film and the sealant. A second wall is arranged on the second substrate, and the second wall is between an edge of the second alignment film and the plastic film. In this way, the distance between an active area and edges of the display panel is reduced so that the narrow bezel design may be implemented.

10 Claims, 3 Drawing Sheets

DISPLAY PANEL AND LIQUID CRYSTAL DEVICE WITH THE SAME

BACKGROUND OF THE INVENTION

1. Field of the Invention

Embodiments of the present disclosure relate to display technology, and more particularly to a display panel and a liquid display device with the same.

2. Discussion of the Related Art

Recently, narrow bezel liquid crystal devices (LCD) are more and more popular. Currently, the process of coating the alignment films is difficult to be controlled as the edges of the alignment film is not even. In order not to affect the display performance, the edges of the alignment films are designed to be close to the edges of the Active Area (AA) of liquid crystal panels. On the other hand, the overlap of the alignment films and the sealant may affect the gluing of the sealant, and thus it is difficult to implement the narrow bezel design.

In view of the above, there is a need to provide a display panel and a liquid crystal device to overcome the above-mentioned problems.

SUMMARY

In order to resolve the technical issue encountered by the prior art, the claimed invention provides a display panel and a liquid crystal device. The alignment films and the sealant of the display panel and the liquid crystal device are not overlapped. Thus, the distance between the active area and edges of the display panel is reduced so as to implement the narrow bezel design.

In one aspect, a display panel, including a first substrate, a second substrate and a sealant. The first substrate includes a first surface. The second substrate is opposite to the first substrate. The first surface of first substrate faces forward the second substrate. A first alignment film is arranged on the first surface of the first substrate. The second substrate includes a second surface facing forward the first substrate. The second alignment film is arranged on the second surface of the second substrate. The sealant arranged between the first substrate and the second substrate, and the first alignment film and the second alignment film are within an active area surrounded by the sealant. A first wall is arranged on the first substrate, and the first wall is arranged between an edge of the first alignment film and the sealant. A second wall is arranged on the second substrate, and the second wall is arranged between an edge of the second alignment film and the sealant. Wherein two first walls are arranged on the first substrate, one of the first walls is arranged closely adjacent to the edge of the first alignment film, and the other first wall is arranged closely to the sealant. The two second walls are arranged on the second substrate, one of the second walls is arranged closely adjacent to the edge of the second alignment film, and the other second wall is arranged closely to the sealant.

Wherein the first wall and the second wall are spaced from each other in a horizontal direction, or the first wall and the second wall are symmetrically arranged in the horizontal direction when the distance between the first substrate and the second substrate is larger than a sum of the height of the first wall and the height of the second wall.

In another aspect, a display panel includes a first substrate includes as first surface, a second substrate and a sealant. The second substrate is opposite to the first substrate. The first surface of first substrate faces forward the second substrate, and a first alignment film is arranged on the first surface of the first substrate. The second substrate includes a second surface facing forward the first substrate, and a second alignment film is arranged on the second surface of the second substrate. The sealant arranged between the first substrate and the second substrate, and the first alignment film and the second alignment film are within an active area surrounded by the sealant. A first wall is arranged on the first substrate, and the first wall is arranged between an edge of the first alignment film and the sealant. A second wall is arranged on the second substrate, and the second wall is arranged between an edge of the second alignment film and the sealant.

Wherein the first wall is arranged closely adjacent to the edge of the first alignment film.

Wherein the second wall is arranged closely adjacent to the edge of the second alignment film.

Wherein two first walls are arranged on the first substrate, one of the first walls is arranged closely adjacent to the edges of the first alignment film, and the other first wall is arranged closely to the sealant.

Wherein the two second walls are arranged on the second substrate, one of the second walls is arranged closely adjacent to the edge of the second alignment film, and the other second wall is arranged closely to the sealant.

Wherein the first wall and the second wall are spaced from each other in a horizontal direction, or the first wall and the second wall are symmetrically arranged in the horizontal direction when the distance between the first substrate and the second substrate is larger than a sum of the height of the first wall and the height of the second wall Wherein the first wall is a spaced sub-layer.

Wherein the first substrate is a color filter substrate, the second substrate is a thin-film transistor array substrate, and the second wall is formed by etching at least one groove on the second substrate.

Wherein the height of the first wall is larger than the height of the first alignment film and the height of the second wall is larger than the height of the second alignment film.

In another aspect, a liquid crystal display having a display panel includes a first substrate includes a first surface, a second substrate, and a sealant. The second substrate opposite to the first substrate. The first surface of first substrate faces forward the second substrate, and a first alignment film is arranged on the first surface of the first substrate. The second substrate includes a second surface facing forward the first substrate, and a second alignment film is arranged on the second surface of the second substrate. The sealant arranged between the first substrate and the second substrate, and the first alignment film and the second alignment film are within an active area surrounded by the sealant. A first wall is arranged on the first substrate, and the first wall is arranged between an edge of the first alignment film and the sealant. A second wall is arranged on the second substrate, and the second wall is arranged between an edge of the second alignment film and the sealant.

Wherein the first wall is arranged closely adjacent to the edge of the first alignment film.

Wherein the second wall is arranged closely adjacent to the edge of the second alignment film.

Wherein two first walls are arranged on the first substrate, one of the first walls is arranged closely adjacent to the edges of the first alignment film, and the other first wall is arranged closely to the sealant.

Wherein two second walls are arranged on the second substrate, one of the second walls is arranged closely adjacent to the edge or the second alignment film, and the other second wall is arranged closely to the sealant.

Wherein the first wall and the second wall are spaced from each other in a horizontal direction, or the first wall and the second wall are symmetrically arranged in the horizontal direction when the distance between the first substrate and the second substrate is larger than a sum of the height of the first wall and the height of the second wall.

Wherein the first wall is a spaced sub-layer.

Wherein the first substrate is a color filter substrate, the second substrate is a thin-film transistor array substrate, and the second wall is formed by etching at least one groove on the second substrate.

Wherein the height of the first wall is larger than the height of the first alignment film and the height of the second wall is larger than the height of the second alignment film.

Comparing with the conventional technology, the claimed invention provides a solution of disposing a first wall on the color filter substrate and disposing a second wall on the thin-film transistor array substrate. The walls keep the alignment films from flowing to the sealant so that the alignment film and the sealant are not overlapped. Thus, the distance between the active are and the edges of the panels are reduced, and the narrow bezel design may be implemented.

DETAILED DESCRIPTION OF THE EMBODIMENTS

Embodiments of the invention will now be described more fully hereinafter with reference to the accompanying drawings, in which embodiments of the invention are shown.

Figure 1:
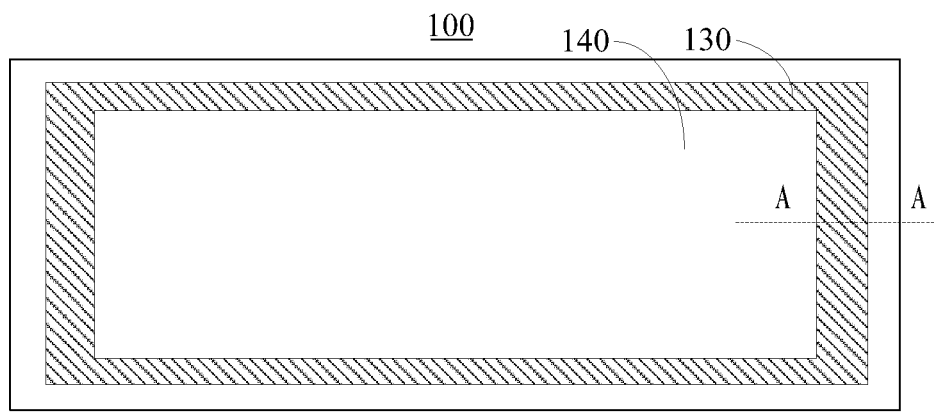
FIG. 1 is a top view of the display panel in accordance with a first embodiment of the claimed invention.

FIG. 1 is a top view of the display panel 100 in accordance with a first embodiment of the claimed invention. The display panel 100 includes a sealant 130 and an active area 140 surrounded by the sealant 130.

Figure 2:
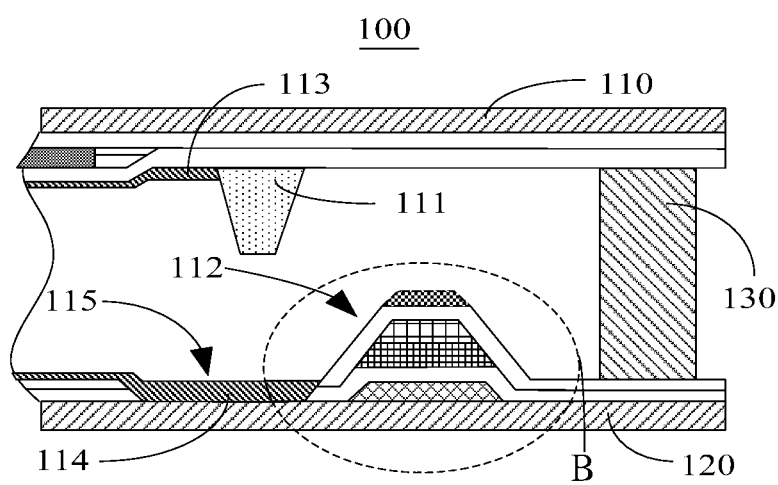
FIG. 2 is a cross-sectional view of the display panel of FIG. 1 along the A-A line.

FIG. 2 is a cross-sectional view of the display panel of along the A-A line. Referring to FIGS. 1 and 2, the display panel 100 includes a first substrate 110, a second substrate 120 and the sealant 130. The first substrate 110 is opposite to the second substrate 120. The sealant 130 is arranged between the first substrate 110 and the second substrate 120 by gluing or other methods. The sealant 130 is for sealing the display materials, such as liquid crystal, within the display panel 100. In addition, the sealant 130 keeps the components and circuits from being affected by external factors.

The first substrate 110 is a color filter substrate. The second substrate 120 is a thin-film transistor array substrate. The first substrate 110 has to first surface facing forward the second substrate 120. A first alignment film 113 is arranged on the first surface of the first substrate 110. In addition, a first wall 111 is arranged on the first substrate 110. Specifically, the first wall 111 is arranged between an edge of the first alignment film 113 and the sealant 130. The second substrate 120 has a second surface facing forward the first substrate 110. A second alignment film 114 is arranged on the second surface of the second substrate 120. In addition, a second wall 112 is arranged on the second substrate 120. Specifically, the second wall 112 is arranged between an edge of the second alignment film 114 and the sealant 130.

In one embodiment, the first wall 111 and the second wall 112 are spaced from each other in a horizontal direction. In addition, the first wall 111 and the second wall 112 are made by different materials. In other embodiments, the first wall 111 and the second wall 112 may be symmetrically arranged in the horizontal direction when the distance between the first substrate 110 and the second substrate 120 is larger than a sum of the height of the first wall and the height of the second wall 112.

Specifically, the first alignment film 113 and the second alignment film 114 are within the area surrounded by the sealant 130. The first wall 111 is arranged closely adjacent to the edge of the first alignment film 113. The second wall 112 is arranged closely adjacent to the edge of the second alignment film 114. In addition, as shown in FIG. 2, the height of the first wall 111 is larger than the height of the first alignment film 113, and the height of the second wall 112 is larger than the height of the second alignment film 114.

When coating the alignment films, the first alignment film 113 is blocked by the first wall 111. Thus, the first alignment film 113 remains in a first side of the first wall 111, wherein the first side is closer to the first alignment film 113 than the other side.

The second alignment film 114 is blocked by the second wall 112. Thus, the second alignment film 114 remains in a second side of the second wall 112, wherein the second side is closer to the first alignment film 113 than the other side.

As shown in FIG. 2, in the embodiment, as the first wall 111 and the second wall 112 respectively prevent the first alignment film 113 and the second alignment film 114 from flowing to the sealant 130, and thus the first alignment film 113 and the second alignment film 114 are not overlapped with the sealant 130. Therefore, the gluing effect of the sealant 130 is not affected.

Furthermore, in the embodiment, the first wall 111 is a spaced sub-layer and is arranged on the first substrate 110 by gluing or other methods.

Figure 3:
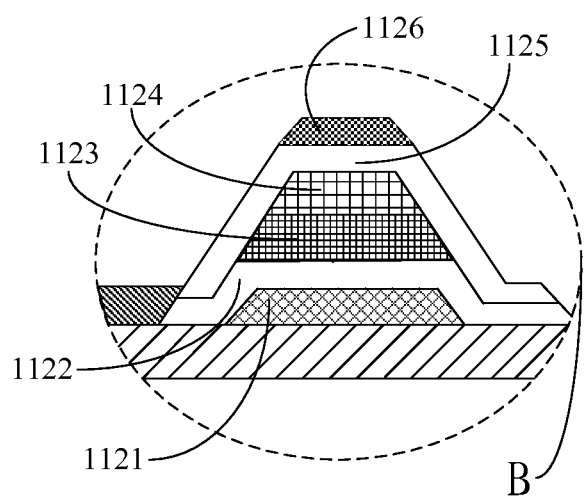
FIG. 3 is an enlarged schematic view of section B of FIG. 2.

The second wall 112 is formed by etching at least one groove 115 on the second substrate 120. FIG. 3 is an enlarged schematic view of section B of FIG. 2. Referring to FIGS. 2 and 3, the second wall 112 is a multi-layer including a first metal layer 1121, a first insulation layer 1122, art amorphous silicon layer 1123, a second metal layer 1124, a second insulation layer 1125, and a conductive layer 1126. The multi-layer wall is formed during the process of forming driven circuits for the display panel 100 on the second substrate 120. In addition, the multi-layer structure may be formed without adopting the etching process, such as disposing a wall structure on the second substrate 120 to form the second wall 112.

In view of the above, by disposing the first wall 111 on the first substrate 110 and by disposing the second wall 112 on the second substrate 120, the first wall 111 and the second wall 112 respectively prevent the first alignment film 113 and the second alignment film 114 from flowing to the sealant 130. Thus, the first alignment film 113 and the second alignment film 114 are not overlapped with the sealant 130.

It is understood that in other embodiments, multiple walls may be arranged so as to prevent the alignment films from overlapping with the sealant.

Figure 4:
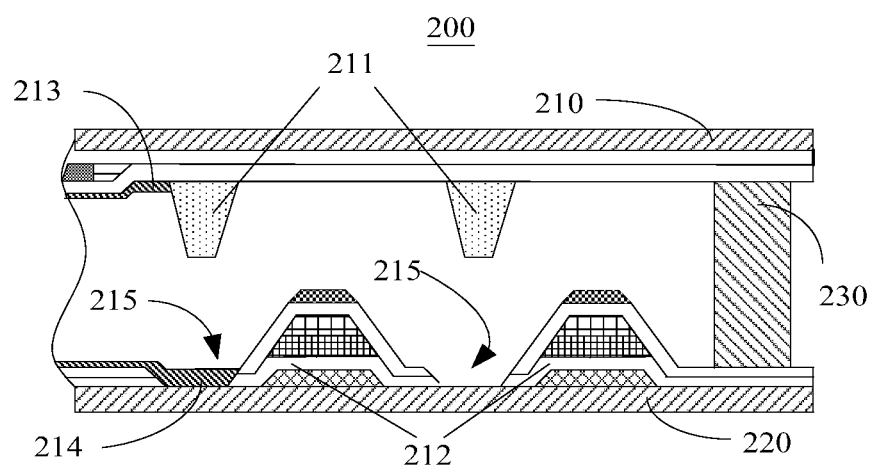
FIG. 4 is a cross-sectional view of the display panel in accordance with a second embodiment or the claimed invention.

FIG. 4 is a cross-sectional view or the display panel in accordance with a second embodiment. As shown in FIG. 4, two first walls 211 arranged on the first substrate 210. One of the first walls 211 is arranged closely adjacent to the edge of the first alignment film 213, and the other first wall 211 is arranged adjacent to the sealant 230.

Two second walls 212 are arranged on the second substrate 220. One of the second walls 212 is arranged closely adjacent to the edge of the second alignment film 214, and the other second wall 212 is arranged adjacent to the sealant 230.

In the embodiment, two first walls 211 are arranged on the first substrate 210, and two second walls 212 are formed on the second substrate 220. The two second walls 212 are formed by etching two grooves 215 on the second substrate 220. When an excess of alignment films flows over one of the walls, the other walls may prevent the alignment films from flowing to the sealant 230.

Figure 5:
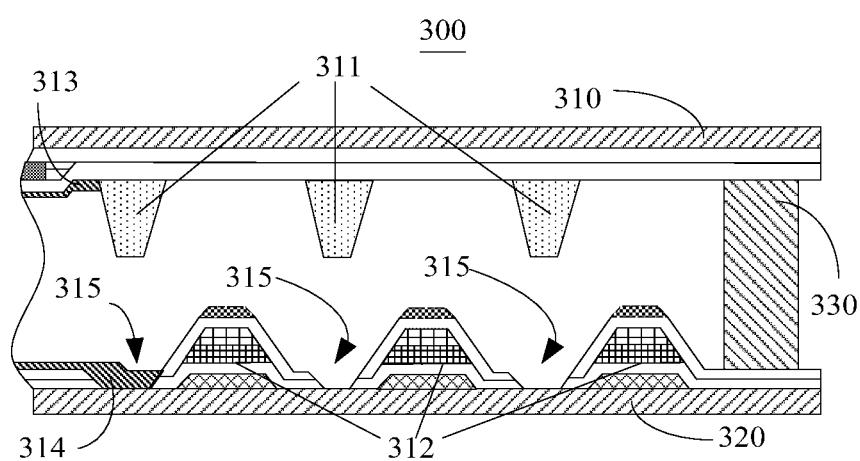
FIG. 5 is a cross-sectional view of the display panel in accordance with a third embodiment of the claimed invention.

In other embodiments, multiple walls may be arranged to prevent the alignment films from flowing to the sealant. FIG. 5 is a cross-sectional view or the display panel in accordance with a third embodiment of the claimed invention. As shown in FIG. 5, three first walls 311 are arranged on the first substrate 310, and three second walls 312 are formed on the second substrate. The three second walls 312 are formed by etching three grooves 3215 on the second substrate 220. The three first walls and second walls are for blocking the excess or the alignment films. It is understood that the number of the first walls and second walls may be, but not limited to, one, two, three, or more than three.

In one embodiment, a liquid crystal device, such as LCD TV, includes the display panels disclosed in the above embodiments.

In view or the above, by disposing a first wall on the color filter substrate and a second wall on the thin-film transistor array substrate, the walls keep the alignment films from flowing to the sealant. In this way, the alignment film and the sealant are not overlapped. Thus, the distance between the active are and the edges of the panels are reduced, and the narrow bezel design may be implemented.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A display panel, comprising:
   a first substrate comprises a first surface;
   a second substrate opposite to the first substrate, the first surface of first substrate faces forward the second substrate, and a first alignment film is arranged on the first surface of the first substrate, the second substrate comprises a second surface facing forward the first substrate, a second alignment film is arranged on the second surface of the second substrate;
   a sealant arranged between the first substrate and the second substrate, and the first alignment film and the second alignment film are within an active area surrounded by the sealant;
   a first wall is arranged on the first substrate, and the first wall is arranged between an edge of the first alignment film and the sealant;
   a second wall is arranged on the second substrate, and the second wall is arranged between an edge of the second alignment film and the sealant;
   wherein two first walls are arranged on the first substrate, one of the first wall is arranged closely adjacent to the edge of the first alignment film, and the other first wall is arranged closely to the sealant; and
   the two second walls are arranged on the second substrate, one of the second walls is arranged closely adjacent to the edge of the second alignment film, the other second wall is arranged closely to the sealant, and the two second walls are spaced apart from each other.

2. The display panel as claimed in claim 1, wherein the first wall and the second wall are spaced from each other in a horizontal direction, or the first wall and the second wall are symmetrically arranged in the horizontal direction when the distance between the first substrate and the second substrate is larger than a sum of the height of the first wall and the height of the second wall.

3. The display panel as claimed in claim 1, wherein the first wall is a spaced sub-layer.

4. The display panel as claimed in claim 1, wherein the first substrate is a color filter substrate, the second substrate is a thin-film transistor array substrate, and the second wall is formed by etching at least one groove on the second substrate.

5. The display panel as claimed in claim 1, wherein the height of the first wall is larger than the height of the first alignment film, and the height of the second wall is larger than the height of the second alignment film.

6. A liquid crystal display having a display panel, comprising:
   a first substrate comprises a first surface;
   a second substrate opposite to the first substrate, the first surface of first substrate faces forward the second substrate, and a first alignment film is arranged on the first surface of the first substrate, the second substrate comprises a second surface facing forward the first substrate, a second alignment film is arranged on the second surface of the second substrate;
   a sealant arranged between the first substrate and the second substrate, and the first alignment film and the second alignment film are within an active area surrounded by the sealant;
   a first wall is arranged on the first substrate, and the first wall is arranged between an edge of the first alignment film and the sealant; and
   a second wall is arranged on the second substrate, and the second wall is arranged between an edge of the second alignment film and the sealant;
   wherein two first walls are arranged on the first substrate, one of the first wall is arranged closely adjacent to the edge of the first alignment film, and the other first wall is arranged closely to the sealant; and
   the two second walls are arranged on the second substrate, one of the second walls is arranged closely adjacent to the edge of the second alignment film, the other second wall is arranged closely to the sealant, and the two second walls are spaced apart from each other.

7. The liquid crystal device as claimed in claim 6, wherein the first wall and the second wall are spaced from each other in a horizontal direction, or the first wall and the second wall are symmetrically arranged in the horizontal direction when the distance between the first substrate and the second substrate is larger than a sum of the height of the first wall and the height of the second wall.

8. The liquid crystal device as claimed in claim 6, wherein the first wall is a spaced sub-layer.

9. The liquid crystal device as claimed in claim 6, wherein the first substrate is a color filter substrate, the second substrate is a thin-film transistor array substrate, and the second wall is formed by etching at least one groove on the second substrate.

10. The liquid crystal device as claimed in claim 6, wherein the height of the first wall is larger than the height of the first alignment film, and the height of the second wall is larger than the height of the second alignment film.

* * * * *